(12) United States Patent
Shijo et al.

(10) Patent No.: US 10,259,058 B2
(45) Date of Patent: Apr. 16, 2019

(54) WORKPIECE CUTTING METHOD

(75) Inventors: Akihiro Shijo, Atsugi (JP); Kazuhiro Mitamura, Chigasaki (JP); Akihiko Ikeda, Kawasaki (JP); Syunji Ueda, Mooka (JP); Hiroki Matsunae, Yokohama (JP); Keisuke Yamamoto, Chigasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 243 days.

(21) Appl. No.: 13/702,977

(22) PCT Filed: Jun. 10, 2011

(86) PCT No.: PCT/IB2011/001323
§ 371 (c)(1),
(2), (4) Date: Dec. 7, 2012

(87) PCT Pub. No.: WO2011/158092
PCT Pub. Date: Dec. 22, 2011

(65) Prior Publication Data
US 2013/0074665 A1 Mar. 28, 2013

(30) Foreign Application Priority Data
Jun. 17, 2010 (JP) .................................. 2010-138753

(51) Int. Cl.
*B26D 1/00* (2006.01)
*B26D 1/06* (2006.01)
(Continued)

(52) U.S. Cl.
CPC ........... *B23D 15/04* (2013.01); *B23D 15/002* (2013.01); *B23D 35/001* (2013.01);
(Continued)

(58) Field of Classification Search
CPC . B26D 1/12; B26D 1/125; B26D 1/25; B26D 1/255; B26D 1/26; B26D 1/45;
(Continued)

(56) References Cited

U.S. PATENT DOCUMENTS 3,234,774 A * 2/1966 Margedant ............. B21D 37/10
72/294
3,791,248 A * 2/1974 Pearson ................. B23D 33/00
83/641

(Continued)

FOREIGN PATENT DOCUMENTS

DE 1502879 12/1970
DE 3533012 4/1987
(Continued)

OTHER PUBLICATIONS

An English translation of the Japanese Office Action of corresponding Japanese Application No. JP 2010-138753, dated Jan. 18, 2013, mailed Jan. 22, 2013.
(Continued)

*Primary Examiner* — Jason Daniel Prone
*Assistant Examiner* — Richard D Crosby, Jr.
(74) *Attorney, Agent, or Firm* — Global IP Counselors, LLP

(57) ABSTRACT

A workpiece cutting method basically includes providing a workpiece proximate to a first blade including a first cutting edge. The method further comprises moving a second blade including a second cutting edge in contact with the first blade such that the first and second cutting edges of the first and second blades cooperatively engage to cut the workpiece while maintaining the first and second cutting edges parallel to each other.

17 Claims, 7 Drawing Sheets

(51) Int. Cl.

| | | |
|---|---|---|
| *B26D 1/08* | (2006.01) | |
| *B26D 3/10* | (2006.01) | |
| *B26D 7/26* | (2006.01) | |
| *H01M 4/04* | (2006.01) | |
| *H01M 4/66* | (2006.01) | |
| *B23D 15/00* | (2006.01) | |
| *B23D 15/04* | (2006.01) | |
| *B23D 35/00* | (2006.01) | |
| *H01M 4/139* | (2010.01) | |

(52) U.S. Cl.
CPC .......... *B23D 35/005* (2013.01); *B26D 1/065* (2013.01); *B26D 1/085* (2013.01); *B26D 3/10* (2013.01); *B26D 7/2628* (2013.01); *H01M 4/04* (2013.01); *H01M 4/661* (2013.01); *B26D 2001/002* (2013.01); *B26D 2001/0066* (2013.01); *H01M 4/139* (2013.01); *Y10T 83/04* (2015.04); *Y10T 83/874* (2015.04)

(58) Field of Classification Search
CPC ........ B26D 5/02; B23D 15/00; B23D 15/002; B23D 15/04; B23D 15/06; B23D 15/08; Y10T 83/9454; Y10T 83/9459; Y10T 83/9461; Y10T 83/9464; Y10T 83/8821; Y10T 83/8822; Y10T 83/8828
USPC ......... 83/693, 694, 636, 917, 582, 215, 216, 83/534, 554, 753, 781, 522.15, 527, 83/698.11, 699.21, 699.31, 699.41
See application file for complete search history.

(56) References Cited

U.S. PATENT DOCUMENTS

| | | | | | |
|---|---|---|---|---|---|
| 4,050,338 | A | * | 9/1977 | Pearson | B23D 35/005 74/110 |
| 4,344,605 | A | * | 8/1982 | Ganseuer | B23D 15/04 242/526 |
| 4,619,163 | A | * | 10/1986 | Brown | B23D 45/024 144/245.6 |
| 5,127,294 | A | * | 7/1992 | Mohr | B26D 1/08 83/277 |
| 5,216,614 | A | * | 6/1993 | Kuchta | B26D 5/00 700/134 |
| 5,241,889 | A | * | 9/1993 | Noe | B23D 15/06 83/368 |
| 5,311,799 | A | * | 5/1994 | Mohr | B21D 43/287 83/167 |
| 5,375,496 | A | * | 12/1994 | Peru | B23D 15/00 83/613 |
| 5,458,717 | A | * | 10/1995 | Kurita | B21D 28/16 156/250 |
| 5,806,395 | A | * | 9/1998 | Dafler | B23K 37/08 83/285 |
| 5,986,827 | A | * | 11/1999 | Hale | F16M 11/12 359/819 |
| 8,020,479 | B2 | * | 9/2011 | Lin | 83/694 |
| 8,156,780 | B2 | * | 4/2012 | Fellenberg | B21D 28/02 72/324 |
| 2001/0042431 | A1 | * | 11/2001 | Epskamp et al. | 83/694 |
| 2003/0188616 | A1 | * | 10/2003 | Behymer | 83/613 |
| 2006/0219071 | A1 | * | 10/2006 | Pobuda | B27B 1/007 83/42 |
| 2009/0165626 | A1 | * | 7/2009 | Sundquist et al. | 83/699.41 |
| 2011/0277613 | A1 | * | 11/2011 | Rimai et al. | 83/865 |

FOREIGN PATENT DOCUMENTS

| | | |
|---|---|---|
| DE | 202005000865 | 5/2005 |
| EP | 0878448 | 11/1998 |
| JP | 58-45396 U | 3/1983 |
| JP | 61-40796 Y2 | 11/1986 |
| JP | 62-58113 U | 4/1987 |
| JP | 10-217184 A | 8/1998 |
| JP | 10-235436 A | 9/1998 |
| JP | 2001-198880 A | 7/2001 |
| JP | 2006-252805 | 9/2006 |
| JP | 2007082897 | 4/2007 |
| JP | 2009-023074 A | 2/2009 |
| JP | 2010-036262 A | 2/2010 |

OTHER PUBLICATIONS

An English translation of the Korean Office Action for the corresponding Korean patent application No. 10-2012-7032748 dated Jan. 28, 2014.
An English translation of the Chinese Office Action for the corresponding Chinese patent application No. 201180029850.9 dated Jul. 3, 2014.

* cited by examiner

WORKPIECE CUTTING METHOD

CROSS-REFERENCE TO RELATED APPLICATIONS

This application is a U.S. National stage of International Application No. PCT/IB2011/001323, filed Jun. 10, 2011This application claims priority to Japanese Patent Application No. 2010-138753, filed on Jun. 17, 2010. The entire disclosure of Japanese Patent Application No. 2010-138753 is hereby incorporated herein by reference.

BACKGROUND

Field of the Invention

The present invention generally relates to a workpiece cutting method. More particularly, the present invention relates to a workpiece cutting method for reducing burring on a workpiece being cut.

Background Information

Various types of workpiece cutting methods and apparatus exist. For example, Japanese Laid-Open Patent Publication No. 2006-252805 discloses a cutting apparatus having an upper shear blade and a lower shear blade that are configured to cut a portion of a workpiece.

SUMMARY

However, the cutting apparatus described in Japanese Laid-Open Patent Publication No. 2006-252805 fails to include a mechanism for adjusting a gap between the upper shear blade and the lower shear blade. Thus, when the mechanism is used to cut a thin metal foil having a thickness of several tens of micrometers, such as an aluminum or copper foil that can be used as an electrode foil of a lithium ion secondary battery, a gap between the upper and lower shear blades can cause burring. The burring can occur even if the gap is only several micrometers of separation. Consequently, when the workpiece is a thin flat plate or sheet, burring occurs easily when the workpiece is cut.

Accordingly, an object of the present invention is to reduce the occurrence of burring on a workpiece being cut.

In view of the state of the known technology, one aspect of the present invention provides a workpiece cutting method. The workpiece cutting method basically includes providing a workpiece proximate to a first blade including a first cutting edge, and moving a second blade including a second cutting edge in contact with the first blade such that the first and second cutting edges of the first and second blades cooperatively engage to cut the workpiece while maintaining the first and second cutting edges parallel to each other.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1A:
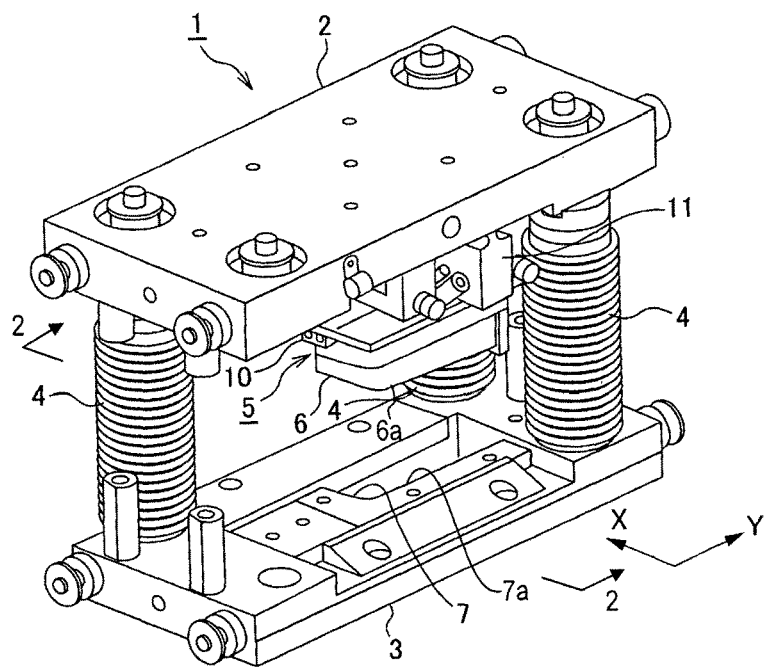
FIG. 1A is a perspective view of a cutting apparatus according to a first disclosed embodiment.
Figure 1B:
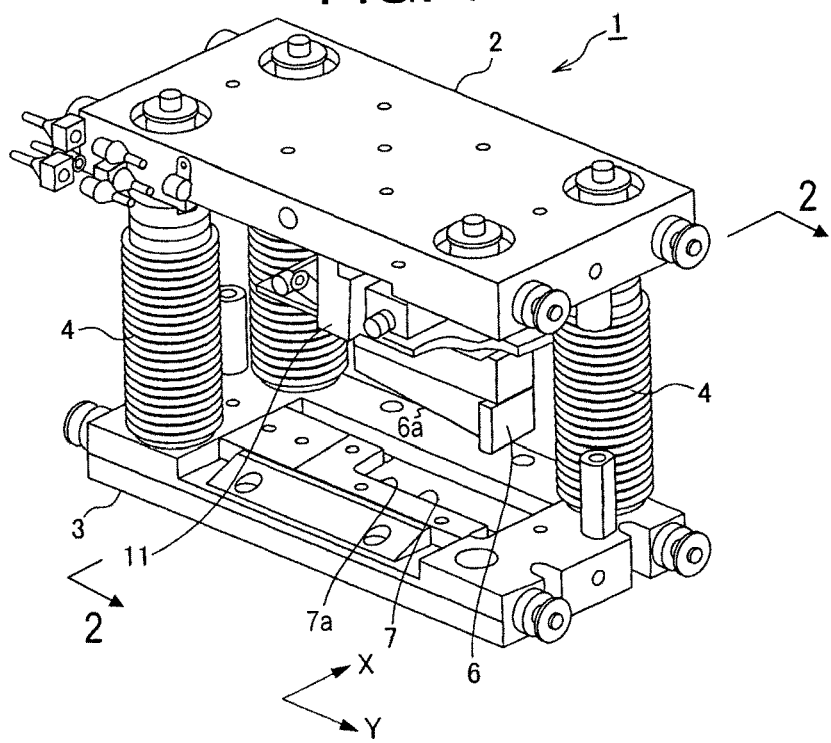
FIG. 1B is another perspective view of the cutting apparatus according to the first disclosed embodiment.
Figure 2:
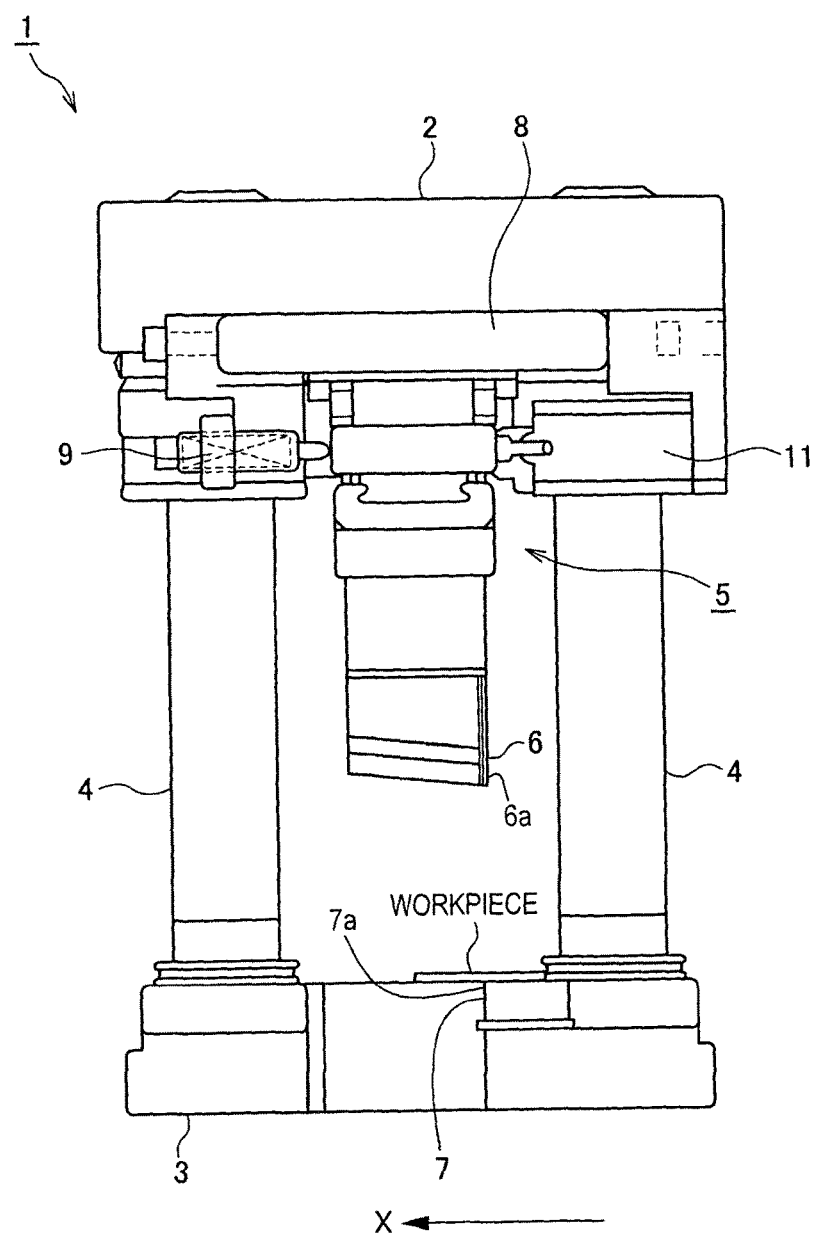
FIG. 2 is a compound cross-sectional view of the cutting apparatus illustrated in FIGS. 1A, 1B and 2 as viewed along section line 2-2 in FIGS. 1A and 1B.

Referring initially to FIGS. 1A to 3, a cutting apparatus 1 is illustrated according to a first disclosed embodiment. FIGS. 1A and 1B are perspective views of the cutting apparatus 1 as seen from different directions. FIG. 2 is a cross sectional view taken along a section line 2-2 in FIGS. 1A and 1B.

The cutting apparatus 1 is configured to be used to cut, for example, thin, flat, sheet-like workpieces. An example of a workpiece is a thin metal foil made of aluminum or copper that is used as a metal electrode foil of a lithium ion secondary battery.

The cutting apparatus 1 includes an upper plate 2 and a lower plate 3 arranged to face opposite each other with a prescribed spacing between the upper plate 2 and the lower plate 3. In this example, the upper plate 2 is configured to be moved up and down by a press device or other actuator (not shown) along guide cylinders 4 that can be arranged at four corners of the lower plate 3. In FIGS. 1A and 1B, one of the guide cylinders is omitted from a foreground of each view.

A moveable unit 5 (moveable component) attaches an upper blade 6 (second blade) to the upper plate 2. A lower blade 7 (first blade) is fixed to the lower plate 3. Thus, the upper blade 6 and lower blade 7 are arranged to cooperate in a cutting manner as discussed in more detail below. The blades 6 and 7 can be made of steel, cemented carbide or any other suitable material. In this example, the upper blade 6 and the lower blade 7 can each be configured as an L-shaped blade as understood in the art. An X axis is defined to extend along a direction parallel or substantially parallel to a short side of the L-shaped blades making up blades 6 and 7. A Y axis is defined to extend along a direction parallel or substantially parallel to a long side of the L-shaped blades making up blades 6 and 7. Both the X axis and the Y axis lie in a plane perpendicular or substantially perpendicular to a vertical movement direction of the upper plate 2. Also, a positive direction along the X axis and a positive direction along the Y axis are both defined to be directions in which the upper blade 6 is separated from the lower blade 7.

As shown in FIG. 2, the moveable unit 5 is attached to a pedestal 8 provided on a bottom surface of the upper plate 2 and can move along the X axis and the Y axis. A first spring plunger 9 is fastened to the pedestal 8 by fastening members such as bolts, screws, rivets or any other suitable fasteners. The first spring plunger 9 is configured to provide a spring reaction force to continuously apply a pressing force against the moveable unit 5 in a negative X direction. As shown in FIG. 1A, a second spring plunger 10 is fastened to the moveable unit 5 by fastening members such as bolts, screws, rivets or any other suitable fasteners. The second spring plunger 10 is configured to provide a spring reaction force to continuously apply a pressing force against the moveable unit 5 in a negative Y direction.

An actuator 11 is provided that faces opposite to the first spring plunger 9 with the moveable unit 5 between the first spring plunger 9 and the actuator 11. The actuator 11 is configured to apply a force against the moveable unit 5 that is opposed to the pressing force of the first spring plunger 9 as necessary or desirable. Thus, the actuator 11 exerts a force to push the moveable unit 5 in the positive X direction when necessary or desirable. The actuator 11 can include an air cylinder in this example. However, the actuator can include any suitable type of mechanism that can apply a force to the moveable unit 5.

Figure 3A:
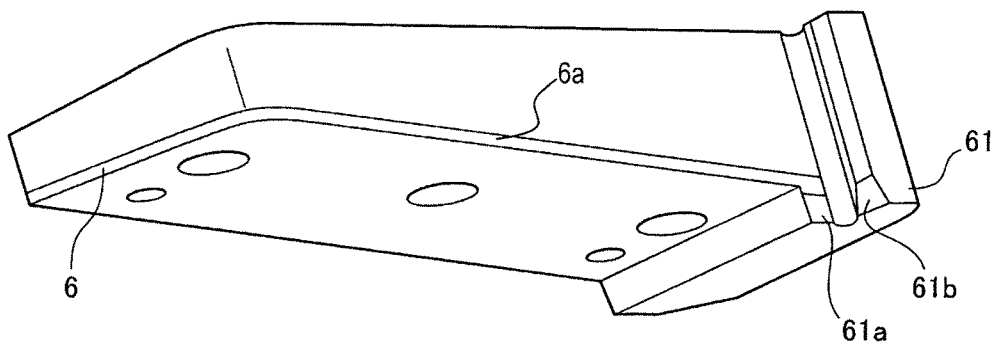
FIG. 3A is an enlarged perspective view of the upper blade of the cutting apparatus.
Figure 3B:
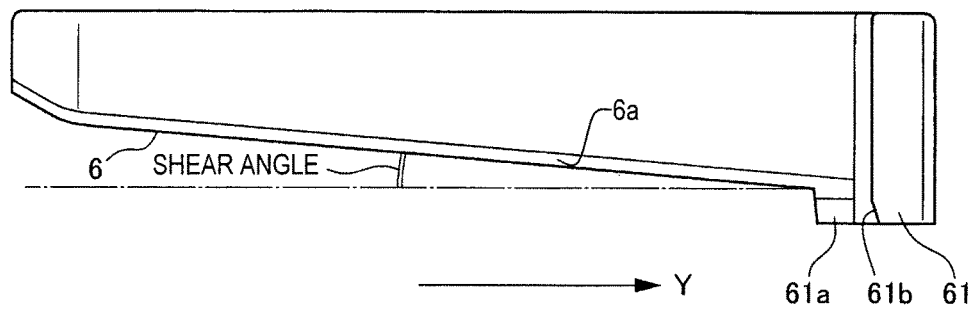
FIG. 3B is an enlarged front elevational view of the upper blade.
Figure 3C:
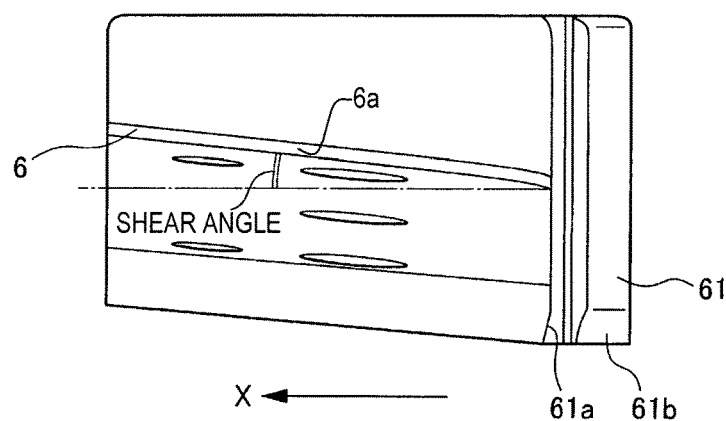
FIG. 3C is an enlarged side elevational view of the upper blade.

FIG. 3A is an enlarged perspective view of the upper blade 6. FIG. 3B is an enlarged front elevational view of the upper blade 6. FIG. 3C is an enlarged side elevational view of the upper blade 6.

As shown in FIGS. 3B and 3C, the upper blade 6 in this example is configured as a shear blade that is slanted at a prescribed shear angle in a direction (upward in the figure) of separation from the lower blade 7 from a base end toward a tip end of the upper blade 6. As a result, when a workpiece is cut, the workpiece is cut beginning at the base end side of the upper blade 6 and along the upper blade 6 in a direction away from the base end side.

As further shown in FIGS. 3A to 3C, an engagement guide 61 is formed on the base end side of the upper blade 6 to adjust an X direction gap and a Y direction gap between the upper blade 6 and the lower blade 7 to zero before a workpiece is cut. In the example, the X direction gap can be referred to as an X-axis clearance and the Y direction gap can be referred to as a Y-axis clearance.

The engagement guide 61 is configured to protrude from the upper blade 6 toward the lower blade 7 (downward in the FIG. 3B). The engagement guide 61 in this example includes a slanted surface 61a that is configured to slant in a positive direction of the X axis. The engagement guide 61 further includes a slanted surface 61b that is configured to slant in a positive direction of the Y axis.

In the following description, a state in which a gap exists between the upper blade 6 and the lower blade 7 is called "positive clearance." Conversely, a state in which the upper blade 6 and the lower blade 7 overlap each other, that is, a state in which the upper blade 6 protrudes over the lower blade 7 in the X-axis and Y-axis directions, is called "negative clearance." Also, a state in which a gap between the upper blade 6 and the lower blade 7 is exactly zero (or insignificantly greater or less than zero) is called "zero clearance."

Furthermore, the engagement guide 61 of the upper blade 6 can contact the lower blade 7 before the upper blade 6 and the lower blade 7 cooperate to perform a cutting operation when the upper plate 2 is moved in a downward direction, such as downward in FIGS. 1A, 1B and 2. Thus, as the upper plate 2 moves downward, the slanted surfaces 61a and 61b of the engagement guide 61 slide against the lower blade 7. Accordingly, the upper blade 6 is moved in the positive X and Y directions by the moveable unit 5 in accordance with the slant angles of the slanted surfaces 61a and 61b. As a result, by the time the upper blade 6 and the lower blade 7 actually begin to perform a cutting operation, the X-axis clearance and the Y-axis clearance have each been revised from a negative clearance to a zero clearance.

Figure 4:
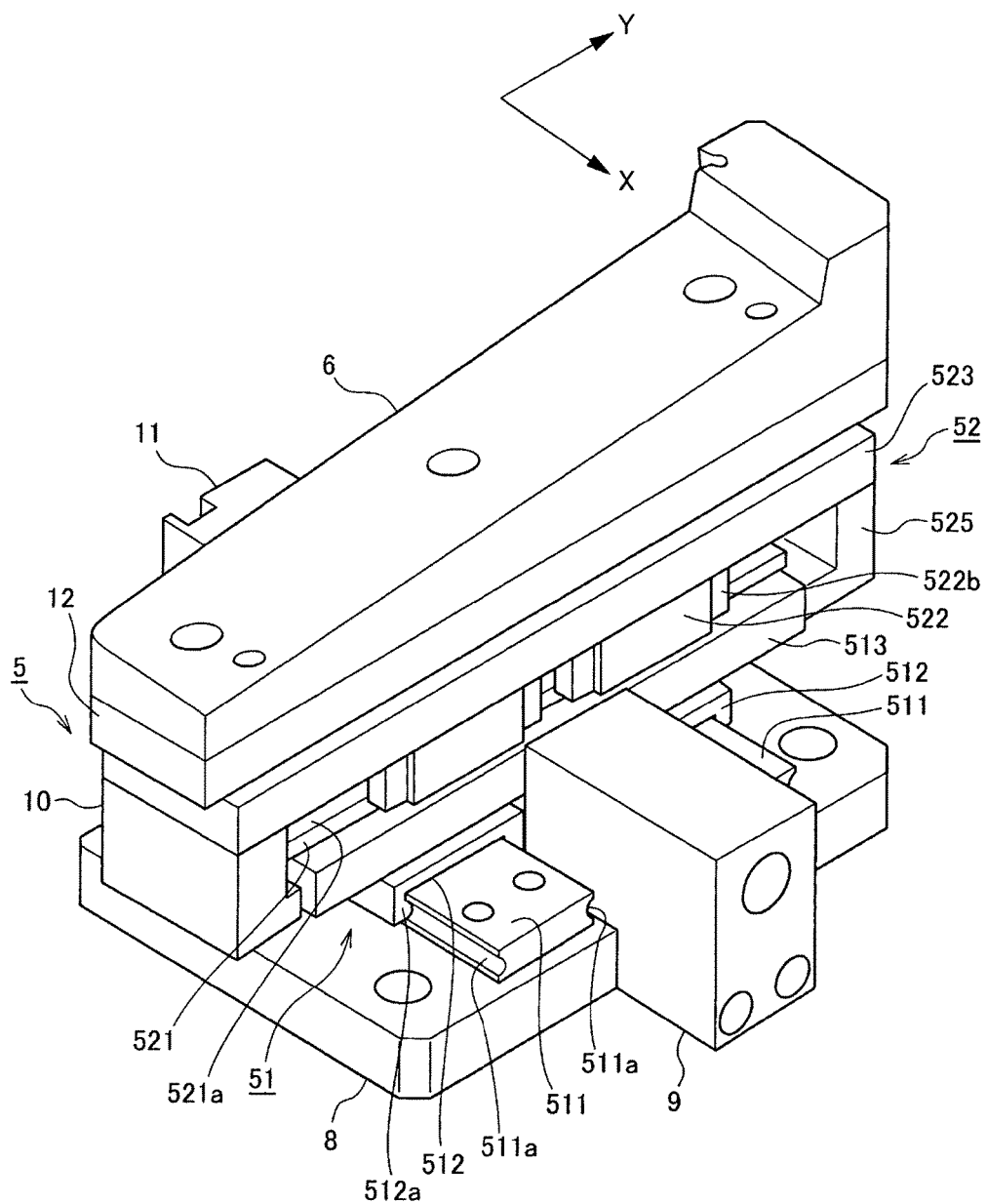
FIG. 4 is an enlarged perspective view of a moveable unit of the cutting apparatus as viewed from a lower plate of the cutting apparatus.

The moveable unit 5 will now be explained in more detail with reference to FIG. 4. FIG. 4 is an enlarged perspective view of the moveable unit 5 as seen from the lower plate 3. As shown in FIG. 4, the moveable unit 5 in this example comprises a first slide device 51 and a second slide device 52.

The first slide device 51 enables the moveable unit 5 to move along the X axis and comprises a first rail 511, a first slider 512 and a first mounting platform 513 in this example. Two first rails 511 are fixed to the pedestal 8. A groove 511a extending in the X-axis direction is formed in each of both side faces of each of the first rails 511. The first sliders 512 have pawl portions 512a that are configured to engage with the grooves of the first rails 511 and can move in the X-axis direction along the first rails 511. The first mounting platform 513 is fixed on the first sliders 512 and serves as a platform on which to arrange the second slide device 52. The first mounting platform 513 is continuously pressed in the negative direction of the X axis by a reaction force of the first spring plunger 9.

The second slide device 52 enables the moveable unit 5 to move along the Y axis and comprises a second rail 521, a second slider 522, and a second mounting platform 523. Two second rails 521 are fixed to the first mounting platform 513. A groove 521a extending in the Y-axis direction is formed in each of both side faces of each of the second rails 521. The second sliders 522 have pawl portions 523a that are configured to engage with the grooves 521a of the second rails 521 and can move in the Y-axis direction along the second rails 521.

The second stationary platform 523 is fixed on the second sliders 522 and serves as a platform on which to fasten the upper blade 6 through a holder 12. The second mounting platform 523 is longer than the first mounting platform in the Y-axis direction. The second spring plunger 10 is fastened to a bottom surface of an end portion of the second mounting platform 523 located in the negative Y-axis direction. The second spring plunger 10 protrudes toward the first mounting platform 513 and serves to continuously press the first mounting platform 513 in a negative Y-axis direction. As a result, since the first mounting platform 513 cannot move in the Y-axis direction, the second mounting platform 523 is continuously pressed in the negative Y-axis direction by a reaction force of the second spring plunger 10. A stopper 525 is fixed to a bottom surface of an end portion of the second mounting platform 523 located in the positive Y-axis direction and restricts the amount the moveable unit 5 can move in the negative Y-axis direction.

An example of the operation of the cutting apparatus 1 will now be explained with reference to FIGS. 5A through 5F. FIGS. 5A through 5F are simplified views of the cross sectional view shown in FIG. 2 and illustrate an example of one cycle of a cutting operation performed by the cutting apparatus 1.

FIG. 5A shows an initial position in which the X-axis clearance and the Y-axis clearance between the upper blade 6 and the lower blade 7 are both negative clearances. When the upper plate 2 is lowered from the initial position, a portion of the engagement guide 61 (illustrated in FIGS. 3A-3C) of the upper blade 6 firsts contacts the lower blade 7. As the upper plate 2, and thus the upper blade 6, is lowered further from this state, the slanted surfaces 61a and 61b of the engagement guide 61 (illustrated in FIGS. 3A-3C) of the upper blade 6 slide against the lower blade 7. Accordingly, the moveable unit 5 is moved in the positive X and Y directions in opposition to the pressing forces of the first spring plunger 9 and the second spring plunger 10 (illustrated in Figs. 1A and 4) in accordance with the slant angles of the slanted surfaces 61*a* and 61*b* (illustrated in FIGS. 3A-3C). As a result, by the time the upper blade 6 and the lower blade 7 actually begin to cooperate to perform the cutting, the X-axis clearance and the Y-axis clearance have each been revised from a negative clearance to a zero clearance.

As shown in FIG. 5B, cutting of the workpiece begins with the upper blade 6 and the lower blade 7 positioned such that both the X-axis clearance and the Y-axis clearance are zero clearances. In this embodiment, since the upper blade 6 is a shear blade, the workpiece is cut beginning at the base end side of the upper blade 6.

Furthermore, as discussed above, the moveable unit 5 is continuously pressed in the negative X-axis and negative Y-axis directions by the first spring plunger 9 and the second spring plunger 10. The first spring plunger 9 and second spring plunger 10 can thus be collectively referred to as pressing component. Consequently, when the workpiece is being cut, a cutting edge 6*a* (second cutting edge) of the upper blade 6 is continuously maintained parallel or substantially parallel to a cutting edge 7*a* (first cutting edge) of the lower blade 7. Thus, the upper blade 6 and lower blade 7 engage each other such that they are in contact with each other. As a result, when a workpiece is cut, the upper blade 6 and the lower blade 7 can be held in such a state that both the X-axis clearance and the Y-axis clearance are zero clearances for the duration of the cut.

Figure 5:
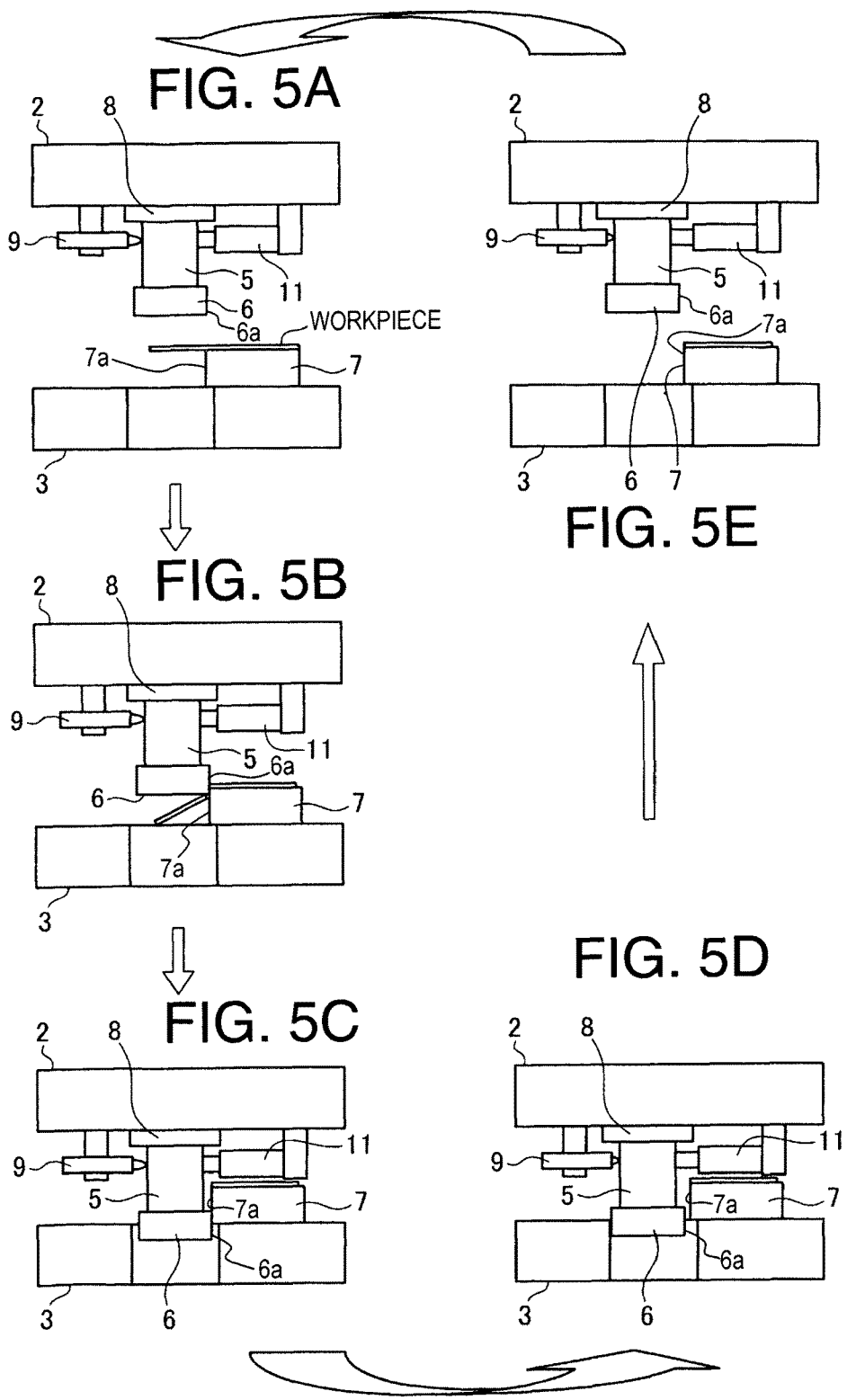
FIGS. 5A through 5E illustrate a sequence of simplified diagrammatic views showing an example of the cutting operation of the cutting apparatus.

As shown in FIG. 5 C, when the upper plate 2 has been lowered to a dead bottom position and cutting of the workpiece is complete, the actuator 11 is driven to move the moveable unit 5 in the positive X-axis direction as shown in FIG. 5 D. Accordingly, X-axis clearance and the Y-axis clearance between the upper blade 6 and the lower blade 7 are changed to positive clearances.

Then, as shown in FIG. 5E, the upper plate 2 is raised to a dead top position while maintaining the X-axis clearance and the Y-axis clearance as positive clearances. Thus, the upper blade 6 and the lower blade 7 do not contact each other when the upper plate 2 is raised. As a result, the workpiece can be prevented from getting caught by the rising upper blade 6, which prevents burring from occurring.

As can be appreciated from the above, the moveable unit 5 is continuously pressed in the negative X-axis direction and the negative Y-axis direction by the first spring plunger 9 and the second spring plunger 10. Consequently, even while the workpiece is being cut, the X-axis clearance and the Y-axis clearance between the upper blade 6 and the lower blade 7 can be held continuously at zero clearance. As a result, the occurrence of burring on the workpiece can be suppressed. Also, since the cutting edge 6*a* of the upper blade 6 and the cutting edge 7*a* of the lower blade 7 are maintained parallel or substantially to each other, the service life of the cutting edges 6*a* and 7*a* of the upper blade 6 and the lower blade 7 can be improved. That is, even though the service life of the cutting edges 6*a* and 7*a* declines due to the contact of the upper blade 6 and the lower blade 7 against each other, the service life of the cutting edges 6*a* and 7*a* can be improved in comparison with an arrangement in which the cutting edge 6*a* of the upper blade 6 is not maintained parallel to the cutting edge 7*a* of the lower blade 7. Also, by keeping the cutting edge 6*a* of the upper blade 6 parallel or substantially parallel to the cutting edge 7*a* of the lower blade 7, the workpiece can be cut with a constant or substantially constant pressure. This can ensure a consistently smooth cutting of the workpiece.

As can further be appreciated from the above, the engagement guide 61 formed on the upper blade 6 adjusts the X-axis clearance and the Y-axis clearance to zero clearance easily before cutting of the workpiece begins. Also, the second spring plunger 10 which is attached to the second mounting platform 523 enables the size of the second spring plunger 10, and thus the size of the cutting apparatus 1 as a whole, to be reduced. In particular, the size of the second spring plunger 10 and the cutting apparatus 1 as a whole can be smaller in comparison with a configuration in which the second spring plunger 10 is mounted to, for example, the pedestal 8 to push directly against the second mounting platform in the Y-axis direction. Moreover, since the upper blade 6 is a shear blade, the upper blade 6 can cut workpiece starting at one end and continuing to the other end to complete the cut. This type of cutting can prevent the workpiece from getting caught on the upper blade 6, the lower blade 7, or both, which prevents or at least reduces the occurrence of burring.

A second embodiment will now be explained with reference to FIG. 6 and FIG. 7. The second embodiment differs from the first embodiment in that the upper blade 6 and the lower blade 7 are linear blades. In view of the similarity between the first and second embodiments, the parts of this second embodiment that are similar to the parts of the first embodiment will be given similar reference numerals as the parts of the first embodiment. In addition, the parts of this second embodiment can be made of materials similar to the parts of the first embodiment. Moreover, the descriptions of the parts of the second embodiment that are identical or similar to the parts of the first embodiment may be omitted for the sake of brevity.

Figure 6:
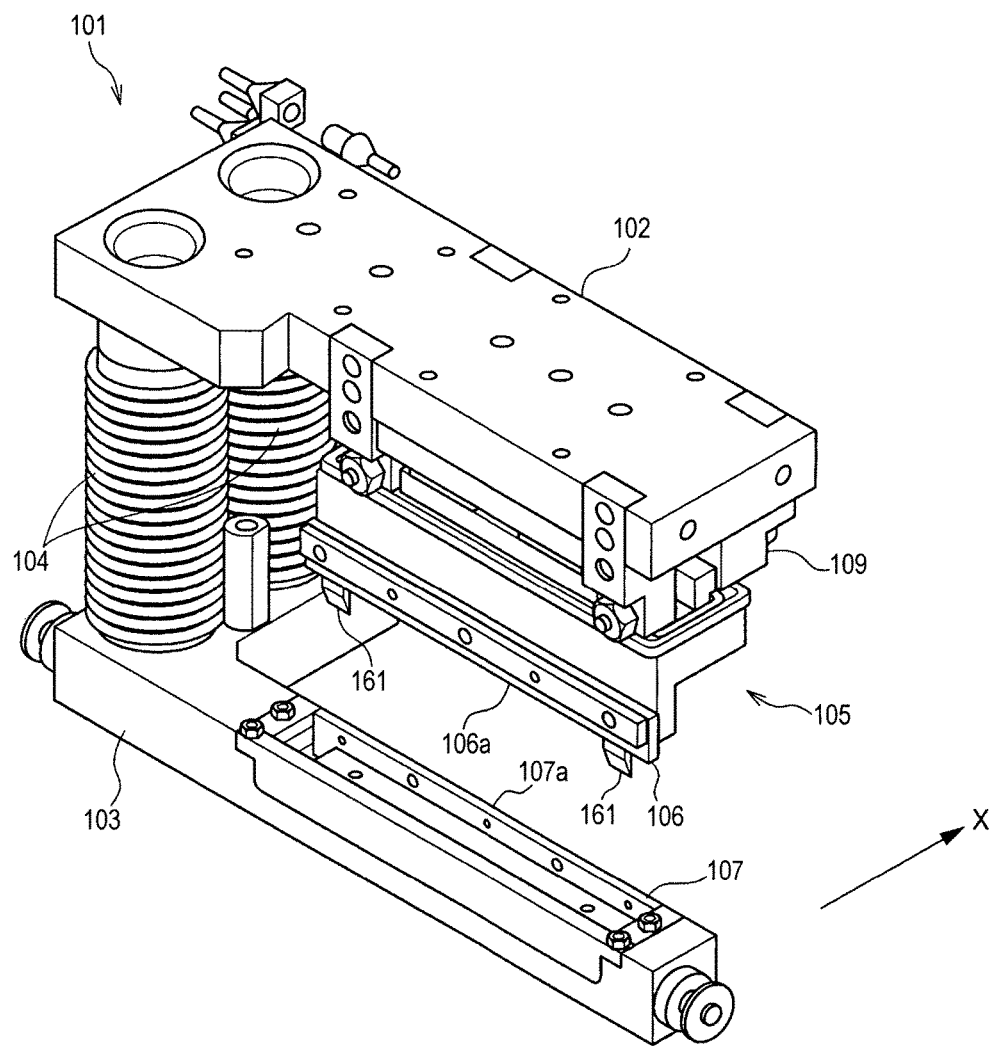
FIG. 6 is an enlarged perspective view of a cutting apparatus according to a second disclosed embodiment.

FIG. 6 is a perspective view of a cutting apparatus 101 according to the second embodiment. Similarly to the previous embodiment, this cutting apparatus 101 has an upper plate 102 and a lower plate 103. The upper plate 102 is configured to move up and down along guide cylinders 104 such that an upper blade 106 (second blade) fixed to a moveable unit 105 (moveable component) cooperates with a lower blade 107 (first blade) fixed to the lower plate 103 to cut a workpiece. The upper blade 106 has a cutting edge 106*a* (second cutting edge) and the lower blade 107 has a cutting edge 107*a* (first cutting edge). In this embodiment, since the upper blade 106 and the lower blade 107 are straight linear blades, the moveable unit 105 need only be driven in the X-axis direction as depicted in the drawings.

Figure 7:
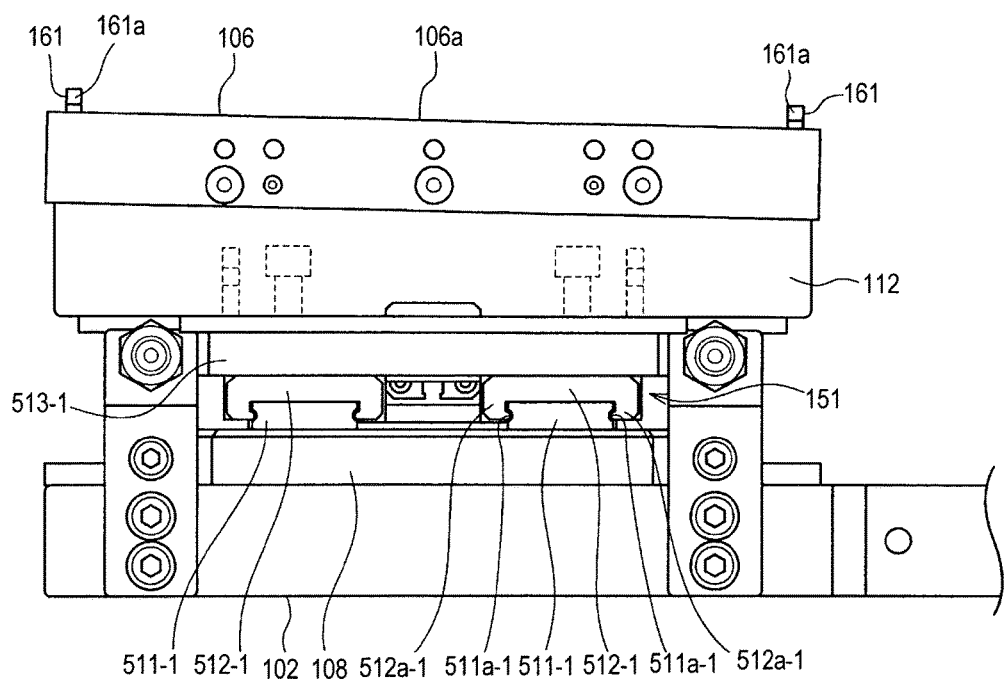
FIG. 7 is an enlarged side elevational view of a moveable unit of the cutting apparatus shown in FIG. 6.

FIG. 7 shows a moveable unit 105 of a cutting apparatus according to this embodiment. In FIG. 7, the negative X-axis direction is a direction coming out of the plane of the page. As shown in FIG. 7, the moveable unit 105 of this embodiment includes one slide device, which is referred to as a first slide device 151. The first slide device 151 enables the moveable unit 105 to move in the X-axis direction, because it is sufficient for the moveable unit 105 to be driven in only the X-axis direction. Consequently, a second spring plunger 10 is not needed.

As with the first embodiment, the first slide device 151 enables the moveable unit 105 to move along the X axis and comprises a first rail 511-1, a first slider 512-1 and a first mounting platform 513-1 in this example. Two first rails 511-1 are fixed to the pedestal 8. A groove 511*a*-1 extending in the X-axis direction is formed in each of both side faces of each of the first rails 511-1. The first sliders 512-1 have pawl portions 512*a*-1 that are configured to engage with the grooves of the first rails 511-1 and can move in the X-axis direction along the first rails 511-1. The first mounting platform 513-1 is fixed on the first sliders 512-1. The first mounting platform 513-1 is continuously pressed in the negative direction of the X axis by a reaction force of the first spring plunger 109. Moreover, the upper blade 106 is fastened to a first mounting platform 513-1 of the first slide device 151 through a holder 112.

Two engagement guides 161 configured to protrude toward the lower blade 7 (upward in FIG. 7) are formed on the upper blade 106. That is, the engagement guides 161 are formed at both ends of the upper blade 106. In this embodiment, each of the engagement guides 161 has a slanted surface 161a configured to slant in a negative X-axis direction downward from a cutting edge 106a of the upper blade 106. As a result, the X-axis clearance between the upper blade 106 and the lower blade 107 can be adjusted from a negative clearance to a zero clearance before the workpiece is cut.

Also, as with the first embodiment, the X-axis clearance between the upper blade 106 and the lower blade 107 is adjusted to zero clearance by the engagement guide 161 of the upper blade 106 before the workpiece is cut. Then, during cutting of the workpiece, the first spring plunger 109 (pressing component) continuously pushes the moveable unit 5 in the negative X-axis direction such that the workpiece is cut while keeping the X-axis clearance at zero clearance. Thus, as in the first embodiment, the cutting edge 106a of the upper blade 106 can be maintained parallel to the cutting edge 107a of the lower blade 107. Also, burring can be prevented or at least reduced when a workpiece is cut, and the service lives of the upper blade 6 and the lower blade 7 can be improved.

While only selected embodiments have been described above, it will be apparent to those skilled in the art from this disclosure that various changes and modifications can be made herein without departing from the scope of the invention as defined in the appended claims. For example, although the blades used in the first embodiment are L-shaped, it is also possible to use an S-shaped blade, a crank-shaped blade or blades of any other suitable shapes. Also in the first embodiment, the second spring plunger 10 can be attached to, for example, the pedestal 8. Thus, the second spring plunger 10 can be configured to push directly against the second mounting platform 52 in the negative Y-axis direction. Furthermore, although the moveable unit 5 (and moveable unit 105) is continuously pressed by spring plungers 9 and 10, a spring, a member made of silicone rubber, or another elastic member can be used instead of a spring plunger 9 or 10 to maintain a continuous pressing force on the moveable unit 5. In addition, a coating film of hydrogen-free DLC (diamond-like carbon) can be applied to one or both of the upper blade 6 and the lower blade 7, and to one or both of the upper blade 106 and lower blade 107 to reduce the occurrence of burring.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "configured" as used herein to describe a component, section or part of a device that is constructed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A workpiece cutting method comprising:
   providing a workpiece proximate to a first blade including a first cutting edge;
   pressing a moveable component comprising a second blade, the second blade including a second cutting edge and a guide section having a slanted surface, toward the first blade such that the slanted surface of the second blade contacts and slides against the first blade to adjust a position of the second blade before the first and second cutting edges contact each other to eliminate a gap between the first and second cutting edges and such that the first and second blades contact each other and the first and second cutting edges are maintained parallel to each other while the first and second blades cooperatively engage to cut the workpiece, the gap extending in a direction transverse to a cutting direction;
   moving the second blade with respect to the first blade after cutting to create a positive clearance, in the direction transverse to the cutting direction, between the first and second cutting edges; and
   moving the second blade from a dead bottom position to a dead top position while the gap between the first blade and the second blade is set to the positive clearance such that the first blade and the second blade do not contact while the second blade moves from the dead bottom position to the dead top position,
   the moveable component being continuously pressed during cutting in an X-direction, the X-direction being parallel to a side of the first and second blades and perpendicular to a vertical movement direction of the second blade.

2. The workpiece cutting method according to claim 1, wherein the moving of the second blade is performed while maintaining the first blade in a fixed position such that the cutting of workpiece is performed with the first blade being fixed.

3. The cutting method according to claim 2, wherein the moving includes moving the second blade transverse to the first blade while maintaining the first and second cutting edges parallel to each other.

4. The workpiece cutting method according to claim 1, wherein
the moving includes moving the second blade transverse to the first blade while maintaining the first and second cutting edges parallel to each other.

5. The cutting method according to claim 1, wherein the moveable component is pressed by a component selected from the group consisting of: a spring plunger, a spring, and a rubber member.

6. A workpiece cutting apparatus comprising:
a stationary plate including a first blade having a first cutting edge;
a moving plate facing opposite the stationary plate and configured to move toward the stationary plate;
a moveable component that is disposed on a surface of the moving plate that faces the stationary plate, the moveable component being moveable along a plane of the surface and including a second blade having a second cutting edge, the second blade including a guide section having a slanted surface;
a pressing component configured to press the moveable component along the plane of the surface of the moving plate when the moving plate moves toward the stationary plate such that the first and second blades contact each other, the pressing component being further configured to press the moveable component toward the first blade to maintain the first and second cutting edges parallel to each other while the first and second blades cooperatively engage to cut the workpiece, the slanted surface of the second blade being configured to contact and slide against the first blade and to adjust a position of the second blade before the first and second cutting edges contact each other to eliminate a gap extending in a direction transverse to a cutting direction between the first and second cutting edges; and
an actuator configured to press the moveable component in an opposite direction respective to the pressing component after the first and second blades have cut the workpiece, the actuator being further configured to create a positive clearance between the first and second cutting edges in a direction transverse to the cutting direction so that as the second blade moves from a dead bottom position to a dead top position the gap between the first blade and the second blade is set to the positive clearance such that the first blade and the second blade do not contact while the second blade moves from the dead bottom position to the dead top position,
the pressing component being configured to continuously apply a pressing force on the moveable component during cutting in an X-direction, the X-direction being parallel to a side of the first and second blades and perpendicular to a vertical movement direction of the second blade.

7. The workpiece cutting apparatus according to claim 6, wherein
the pressing component includes an elastic member configured to provide a reaction force to press the moveable component toward the first blade.

8. The workpiece cutting apparatus according to claim 7, wherein:
the moveable component is configured to move in a direction perpendicular to the first cutting edge of the first blade.

9. The workpiece cutting apparatus according to claim 7, wherein:
the second blade is configured to be slanted at a shear angle such that a tip end of the second cutting edge of the second blade is farther from the first blade than a base end of the second cutting edge of the second blade.

10. The workpiece cutting apparatus according to claim 7, wherein:
at least one of the first and second blades includes a diamond-like carbon coating applied to a surface thereof.

11. The workpiece cutting apparatus according to claim 6, wherein:
the moveable component is configured to move in a direction perpendicular to the first cutting edge of the first blade.

12. The workpiece cutting apparatus according to claim 11, wherein:
the second blade is configured to be slanted at a shear angle such that a tip end of the second cutting edge of the second blade is farther from the first blade than a base end of the second cutting edge of the second blade.

13. The workpiece cutting apparatus according to claim 11, wherein:
at least one of the first and second blades includes a diamond-like carbon coating applied to a surface thereof.

14. The workpiece cutting apparatus according to claim 6, wherein:
the second blade is configured to be slanted at a shear angle such that a tip end of the second cutting edge of the second blade is farther from the first blade than a base end of the second cutting edge of the second blade.

15. The workpiece cutting apparatus according to claim 14, wherein:
at least one of the first and second blades includes a diamond-like carbon coating applied to a surface thereof.

16. The workpiece cutting apparatus according to claim 6, wherein:
at least one of the first and second blades includes a diamond-like carbon coating applied to a surface thereof.

17. The workpiece cutting apparatus according to claim 6, wherein
the pressing component is selected from the group consisting of: a spring plunger, a spring, and a rubber member.

* * * * *